J. H. NICHOLS.
Churn-Motor.
No. 220,411.    Patented Oct. 7, 1879.
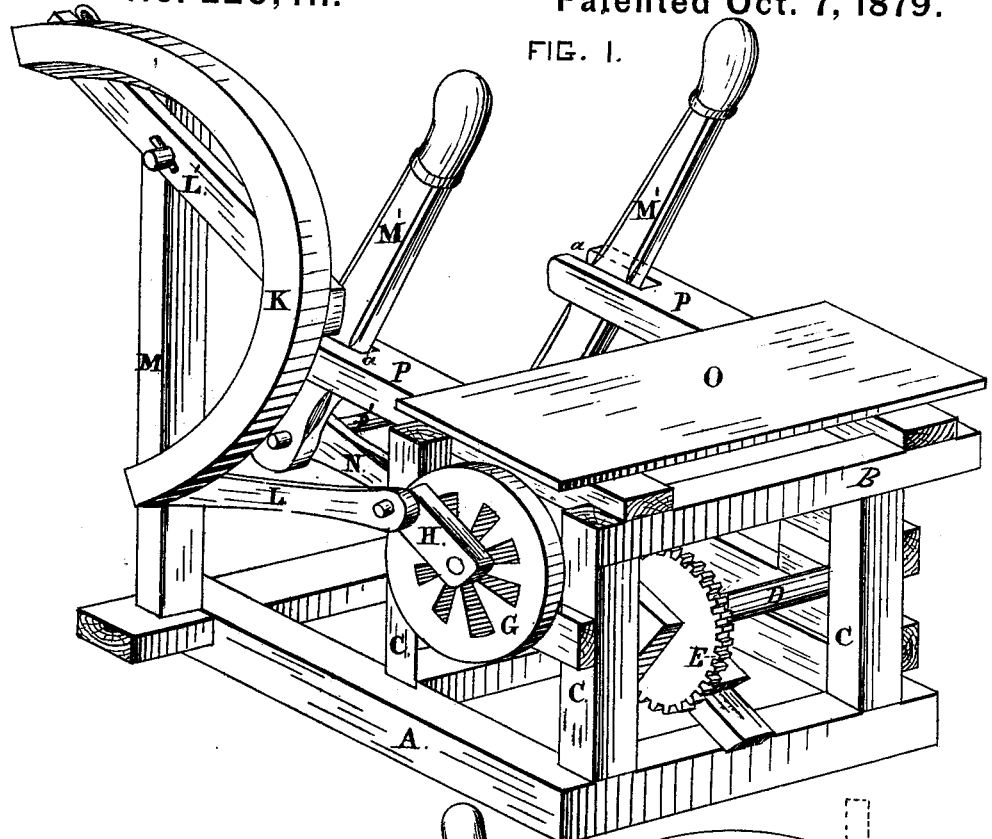
FIG. I.
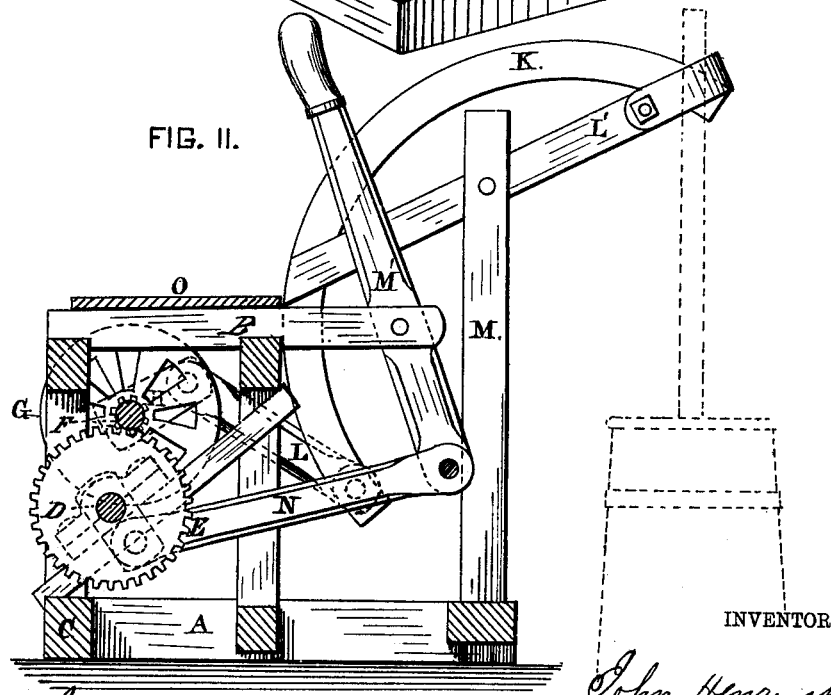
FIG. II.
WITNESSES    INVENTOR
John Henry Nichols

UNITED STATES PATENT OFFICE.

JOHN HENRY NICHOLS, OF WHITE HOUSE STATION, NEW JERSEY.

IMPROVEMENT IN CHURN-MOTORS.

Specification forming part of Letters Patent No. 220,411, dated October 7, 1879; application filed September 10, 1879.

*To all whom it may concern:*

Be it known that I, JOHN HENRY NICHOLS, a resident of White House Station, Hunterdon county, State of New Jersey, have invented certain new and useful Improvements in Churn-Motors, of which the following is a specification.

The invention relates to double rotary gearing, in order to obtain multiplied motion with the least exertion by the operator, and consists of a frame surmounted by a seat for the operator, and gearing connected therewith, and the lever operating the dasher-rod.

Figure 1 represents a perspective view, and Fig. 2 a cross-section.

Similar letters of reference on the drawings denote similar parts.

I construct the motor of two rectangular frames, A and B, and connect them by four upright posts, C. The whole frame is surmounted by a seat, O, for the operator to sit upon in operating the device.

Laterally through the frames pass two shafts, D and F. One is double-cranked, as shown at N N. The other carries but one crank, for connection with the pitman L.

Shaft D has secured thereon a cog gear-wheel, E, and shaft F a pinion meshing into the cog-wheel on shaft D. Shaft F has on its extremity a crank, H, attached thereto, to which is connected the pitman L, and said pitman connects with the rotary dasher-lever, K, braced by a rod, L', which latter is pivoted to post M.

The upper frame has two bars, P, projecting forward of the seat, which are slotted, as shown at *a*, within which slots the operating-levers M' are pivoted. The upper ends of the levers form handles for the operator, and the lower ends are connected by a bar, P', which serves as a support for the feet of the operator and as a means for connecting the pitman N N to the cranks on shaft D.

The operation of the device is as follows: The operator takes his seat, grasps the handles of the levers, and by working them alternately to and fro sets the shaft D in rotary motion, which, gearing with the pinion-shaft, transmits motion to the latter, and it, being connected with the oscillating dasher-lever K, gives motion to the dasher-rod, connected by any suitable means to the extremity of said dasher-lever K.

What I claim as new, and desire to secure by Letters Patent, is—

The churn-motor consisting of the double frames A and B, properly supported and braced, a seat for the operator, operating-levers connected to the gearing, and mechanism for transmitting power to the dasher-rod, as and for the purpose set forth.

JOHN HENRY NICHOLS.

Witnesses:
GEO. M. LOCKWOOD,
JOHN B. CLARK.